(12) United States Patent
Kurokawa

(10) Patent No.: US 9,340,237 B2
(45) Date of Patent: May 17, 2016

(54) FRAME STRUCTURE OF VEHICLE

(71) Applicant: TOYOTA JIDOSHA KABUSHIKI KAISHA, Toyota-shi, Aichi-ken (JP)

(72) Inventor: Hiroyuki Kurokawa, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/578,952

(22) Filed: Dec. 22, 2014

(65) Prior Publication Data

US 2015/0197289 A1   Jul. 16, 2015

(30) Foreign Application Priority Data

Jan. 14, 2014   (JP) .................................. 2014-004624

(51) Int. Cl.
| | | |
|---|---|---|
| B60J 7/00 | (2006.01) | |
| B62D 29/00 | (2006.01) | |
| B62D 25/02 | (2006.01) | |
| B62D 25/04 | (2006.01) | |

(52) U.S. Cl.
CPC ............ *B62D 29/005* (2013.01); *B62D 25/025* (2013.01); *B62D 25/04* (2013.01); *B62D 29/004* (2013.01)

(58) Field of Classification Search
CPC   A63H 1/30; H01L 2924/0002; H01L 41/042; H01L 2924/00014; A61F 13/49004; A61F 13/493; C08L 67/02; C08L 69/00; C08K 5/29; H05K 13/0417
USPC .................................................. 296/187.08
See application file for complete search history.

(56) References Cited

U.S. PATENT DOCUMENTS

| | | | | |
|---|---|---|---|---|
| 3,724,153 A * | 4/1973 | Wessells, III | .......... | B62D 25/02 296/203.03 |
| 4,826,238 A * | 5/1989 | Misono | ................ | B62D 25/025 296/205 |
| 5,173,142 A * | 12/1992 | Billiu | ...................... | B29C 65/02 156/245 |
| 5,212,208 A * | 5/1993 | Soderberg | ............... | B60R 13/08 521/149 |
| 5,338,588 A * | 8/1994 | Billiu | ...................... | B29C 35/08 156/245 |
| 5,810,428 A * | 9/1998 | Maki | ...................... | B62D 25/04 296/187.05 |
| 5,941,597 A * | 8/1999 | Horiuchi | ................ | B62D 25/04 296/193.06 |
| 5,988,733 A * | 11/1999 | Kamo | ................... | B60R 13/025 296/187.05 |
| 6,199,941 B1 * | 3/2001 | Takahara | ................ | B60R 13/02 138/121 |
| 6,233,826 B1 * | 5/2001 | Wycech | .............. | B29C 44/1242 29/402.09 |

(Continued)

FOREIGN PATENT DOCUMENTS

| | | |
|---|---|---|
| JP | 2002012167 A | 1/2002 |
| JP | 2006306257 A | 11/2006 |

(Continued)

*Primary Examiner* — Kiran B Patel
(74) *Attorney, Agent, or Firm* — Oliff PLC

(57) ABSTRACT

A frame structure of a vehicle of the present invention has: a frame member that structures a frame of a vehicle; and a reinforcing member that is made of a fiber reinforced resin. The frame member is formed in a closed cross-sectional shape by a plurality of wall portions, and the frame member includes opening portions in at least one of the wall portion among the plurality of wall portions. The reinforcing member is disposed along the wall portions that have the opening portions, the reinforcing member includes engaging portions having inserted-through portions that are inserted-through the opening portions and lock portions whose surface area is larger than the opening portions, and the engaging portions are integrally formed by the inserted-through portions and the lock portions.

10 Claims, 9 Drawing Sheets

(56) References Cited

U.S. PATENT DOCUMENTS

| | | | | |
|---|---|---|---|---|
| 6,267,436 B1* | 7/2001 | Takahara | B60R 13/02 296/187.05 |
| 6,270,600 B1* | 8/2001 | Wycech | B29C 44/14 156/79 |
| 6,296,301 B1* | 10/2001 | Schroeder | B62D 29/046 296/187.02 |
| 6,341,467 B1* | 1/2002 | Wycech | B29C 44/18 296/193.06 |
| 6,474,726 B1* | 11/2002 | Hanakawa | B62D 25/04 296/187.12 |
| 6,478,367 B2* | 11/2002 | Ishikawa | B62D 25/04 296/199 |
| 6,619,727 B1* | 9/2003 | Barz | B62D 25/04 296/146.6 |
| 6,786,533 B2* | 9/2004 | Bock | B62D 29/002 296/187.02 |
| 6,793,183 B1* | 9/2004 | Hand | B64G 1/641 244/158.1 |
| 7,488,017 B2* | 2/2009 | Lassl | B62D 21/157 293/133 |
| 8,545,956 B2* | 10/2013 | Hoefflin | B29C 44/18 428/212 |
| 8,746,780 B2* | 6/2014 | Belpaire | B62D 25/16 296/187.02 |
| 8,911,008 B1* | 12/2014 | Campbell | B60J 7/0084 296/187.02 |
| 2001/0042353 A1 | 11/2001 | Honda et al. | |
| 2005/0050710 A1* | 3/2005 | Eipper | B62D 29/002 29/463 |
| 2008/0143144 A1* | 6/2008 | Yustick | B62D 21/157 296/187.03 |
| 2009/0134687 A1* | 5/2009 | Kurokawa | B60N 2/015 297/463.1 |
| 2009/0146457 A1* | 6/2009 | Kanagai | B62D 21/157 296/187.12 |
| 2011/0236610 A1 | 9/2011 | Belpaire | |
| 2012/0119546 A1* | 5/2012 | Honda | B62D 25/025 296/203.01 |
| 2012/0256445 A1* | 10/2012 | Baccouche | B62D 25/04 296/193.06 |
| 2013/0187406 A1* | 7/2013 | Torii | B62D 25/025 296/187.12 |
| 2013/0200650 A1* | 8/2013 | Matsuoka | B62D 21/155 296/187.1 |
| 2013/0257098 A1* | 10/2013 | Matsuda | B62D 25/00 296/187.12 |
| 2014/0084633 A1* | 3/2014 | Matsuda | B62D 25/02 296/203.01 |
| 2014/0084635 A1* | 3/2014 | Matsuda | B62D 25/02 296/205 |
| 2014/0158567 A1* | 6/2014 | Park | B62D 25/02 206/335 |
| 2014/0265443 A1* | 9/2014 | Meaige | B62D 29/002 296/187.02 |
| 2014/0327268 A1* | 11/2014 | Mori | B62D 25/20 296/187.08 |
| 2016/0016609 A1* | 1/2016 | Kurokawa | B62D 21/02 299/203.01 |
| 2016/0023293 A1* | 1/2016 | Kurokawa | B23K 1/0008 296/29 |

FOREIGN PATENT DOCUMENTS

| | | |
|---|---|---|
| JP | 2008068720 A | 3/2008 |
| JP | 2009001238 A | 1/2009 |
| JP | 2012501266 A | 1/2012 |
| JP | A-2013-43370 | 3/2013 |
| JP | A-2013-212730 | 10/2013 |

* cited by examiner

FIG.6
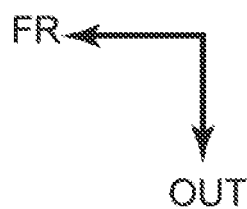
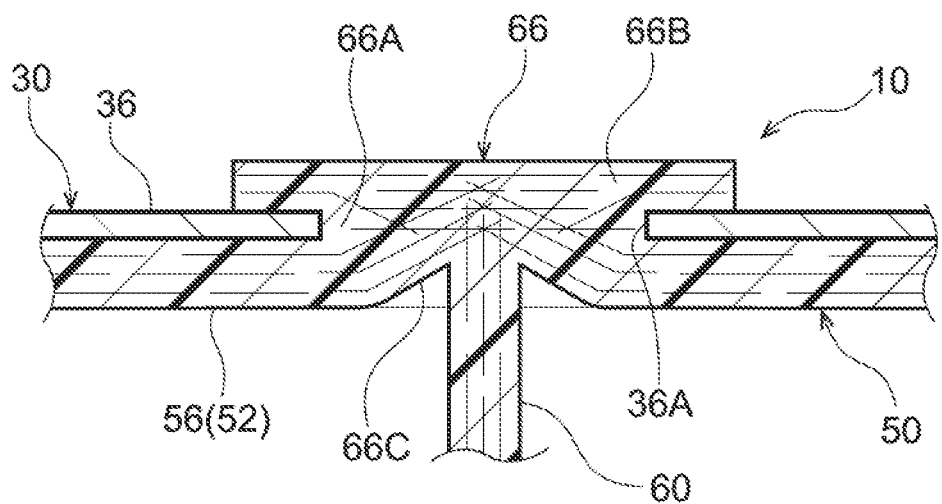

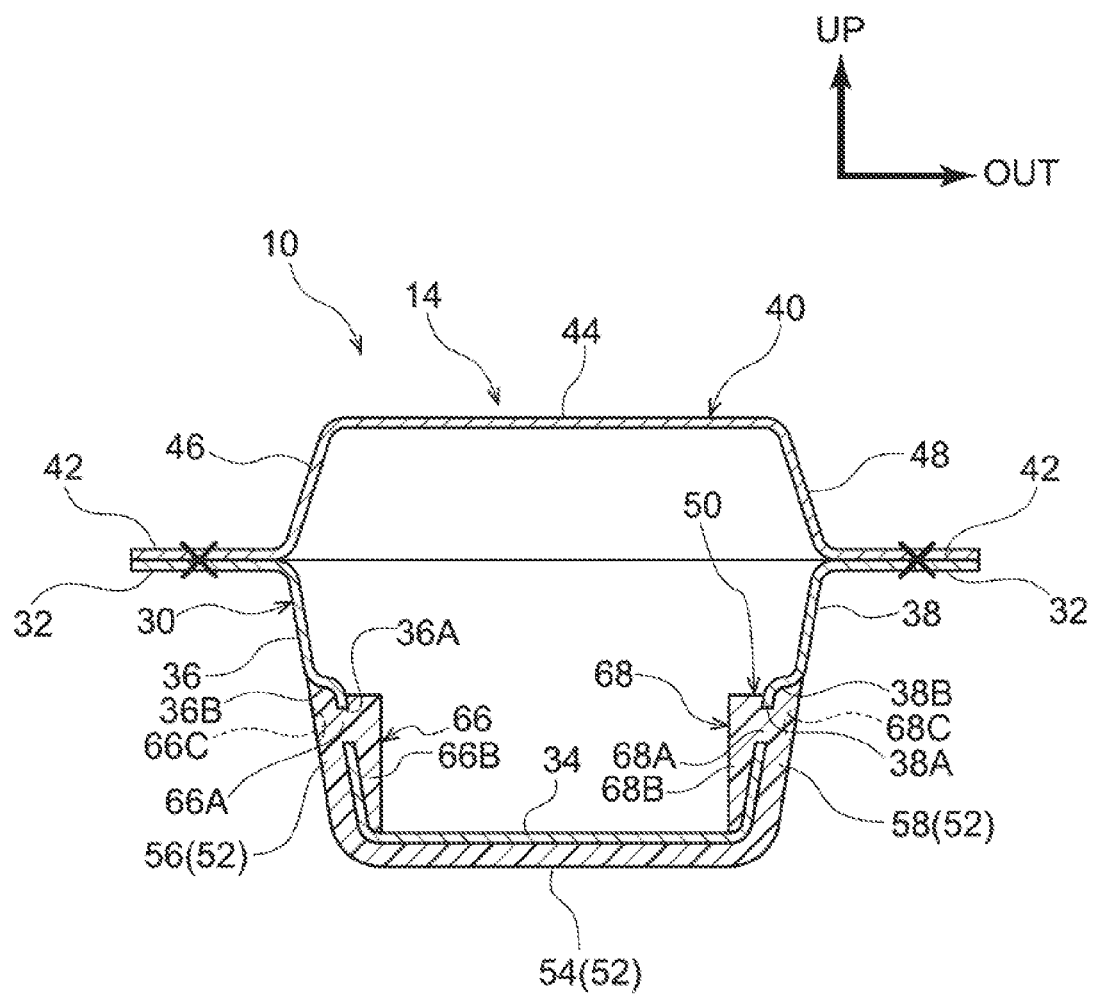

FRAME STRUCTURE OF VEHICLE

CROSS-REFERENCE TO RELATED APPLICATION

This application claims priority under 35 USC 119 from Japanese Patent Application No. 2014-004624 filed Jan. 14, 2014, the disclosure of which is incorporated by reference herein.

BACKGROUND

Technical Field

The present invention relates to a frame structure of a vehicle.

There are conventionally known structures in which a reinforcing member that is formed of a fiber reinforced resin material is fastened and joined by an adhesive, screws, rivets or resin to the interior of a vehicle frame member having a closed cross-sectional shape (see, for example, Japanese Patent Application Laid-Open (JP-A) No. 2013-212730).

However, in a structure in which a reinforcing member is fastened and joined by an adhesive, screws, rivets or resin to the interior of a vehicle frame member, when load is inputted to the vehicle frame member and the vehicle frame member deforms, there is the concern that the reinforcing member may separate from the vehicle frame member.

SUMMARY

The present invention provides a frame structure of a vehicle that, even if load is inputted to a frame member, can suppress separation of a reinforcing member that is provided at the frame member.

A frame structure of a vehicle of a first aspect of the present invention has: a frame member that structures a frame of a vehicle; and a reinforcing member that is made of a fiber reinforced resin, wherein the frame member is formed in a closed cross-sectional shape by a plurality of wall portions, and the frame member includes opening portions in at least one of the wall portion among the plurality of wall portions, and the reinforcing member is disposed along the wall portions that have the opening portions, the reinforcing member includes engaging portions having inserted-through portions that are inserted-through the opening portions and lock portions whose surface area is larger than the opening portions, and the engaging portions are integrally formed by the inserted-through portions and the lock portions.

In accordance with the frame structure of a vehicle of the first aspect, the engaging portions, that are formed integrally with the reinforcing member that is made of a fiber reinforced resin, have the inserted-through portions, that are inserted-through the opening portions of wall portions that structure the closed cross-sectional shape of the frame member, and the lock portions that have a surface area larger than the opening portions. Further, the reinforcing member is disposed along at least the wall portions that have the opening portions, by these engaging portions. Accordingly, even if load is inputted to the frame member, separation of the reinforcing member that is provided at the frame member is suppressed. Namely, even if the frame member deforms due to input of load, separation of the reinforcing member that is provided at the frame member can be suppressed.

Further, in a frame structure of a vehicle of a second aspect of the present invention, in the frame structure of a vehicle of the first aspect, the reinforcing member is disposed within the closed cross-sectional shape.

In accordance with the frame structure of a vehicle of the second aspect, the reinforcing member is provided within the closed cross-sectional shape. Accordingly, separation of the reinforcing member from the frame member is suppressed more, as compared with a structure in which the reinforcing member is provided at the outer surface side of the frame member.

Further, in a frame structure of a vehicle of a third aspect of the present invention, in the frame structure of a vehicle of the second aspect, the wall portions that have the opening portions have concave portions at which peripheries of the opening portions are concave toward an interior of the closed cross-sectional shape, and the lock portions are disposed within the concave portions.

In accordance with the frame structure of a vehicle of the third aspect, the lock portions of the engaging portions of the reinforcing member are disposed within the concave portions that are formed at the peripheries of the opening portions of the wall portions of the frame member. Accordingly, the lock portions of the engaging portions protruding-out further toward the outer side than the wall portions of the frame member is suppressed. Accordingly, the reinforcing member can be placed even if there is no space at the outer surface side of the frame member.

Further, in a frame structure of a vehicle of a fourth aspect of the present invention, in the frame structure of a vehicle of the second aspect, the reinforcing member extends in a length direction of the frame member, and has plural partitioning wall portions that are formed at a predetermined interval in the length direction.

In accordance with the frame structure of a vehicle of the fourth aspect, the reinforcing member has the plural partitioning wall portions at a predetermined interval in the length direction. Accordingly, the strength (rigidity) of the reinforcing member is improved as compared with a structure in which the reinforcing member does not have plural partitioning wall portions at a predetermined interval in the length direction.

Further, in a frame structure of a vehicle of a fifth aspect of the present invention, in the frame structure of a vehicle of the fourth aspect, the opening portions are formed so as to face in a direction orthogonal to the length direction of the frame member, and the engaging portions are formed at both sides of the partitioning wall portions.

In accordance with the frame structure of a vehicle of the fifth aspect, the engaging portions of the reinforcing member are engaged with the frame member at the both sides of the partitioning wall portions. Accordingly, the strength (rigidity) of the engaging portions is improved, and a deterioration in strength (rigidity) of the wall portions, in which the opening portions are formed, of the frame member is suppressed.

Further, in a frame structure of a vehicle of a sixth aspect of the present invention, in the frame structure of a vehicle of the second aspect, the reinforcing member extends in a length direction of the frame member, and has plural reinforcing ribs that are formed at a predetermined interval in the length direction.

In accordance with the frame structure of a vehicle of the sixth aspect, the reinforcing member has the plural reinforcing ribs at a predetermined interval in the length direction. Accordingly, the strength (rigidity) of the reinforcing member is improved as compared with a structure in which the reinforcing member does not have plural reinforcing ribs at a predetermined interval in the length direction.

Further, in a frame structure of a vehicle of a seventh aspect of the present invention, in the frame structure of a vehicle of the sixth aspect, the opening portions are formed so as to face in a direction orthogonal to the length direction of the frame member, and the engaging portions are formed at both sides of the reinforcing ribs.

In accordance with the frame structure of a vehicle of the seventh aspect, the engaging portions of the reinforcing member are engaged with the frame member at the both sides of the reinforcing ribs. Accordingly, the strength (rigidity) of the engaging portions is improved, and a deterioration in strength (rigidity) of the wall portions, in which the opening portions are formed, of the frame member is suppressed.

Further, in a frame structure of a vehicle of an eighth aspect of the present invention, in the frame structure of a vehicle of the first aspect, the reinforcing member has recess portions in surfaces at sides opposite to sides at which the engaging portions are formed.

In accordance with the frame structure of a vehicle of the eighth aspect, the recess portions are formed in surfaces, of the reinforcing member, at the sides opposite to sides at which the engaging portions are formed. Accordingly, the fibers within the resin material become entwined with one another and the reinforcing member is securely joined to the frame member, as compared with a structure in which recess portions are not formed in surfaces, of the reinforcing member, at the side opposite to the sides at which the engaging portions are formed.

Further, in a frame structure of a vehicle of a ninth aspect of the present invention, in the frame structure of a vehicle of the first aspect, the reinforcing member has a main body portion that is formed in a U-shape in cross-section, and the engaging portions are formed at least at an opening side end portion of the main body portion.

In accordance with the frame structure of a vehicle of the ninth aspect, the engaging portions are formed at the opening side end portion of the main body portion, that is formed in a U-shape in cross-section, of the reinforcing member. Accordingly, the reinforcing member separating from the frame member is efficiently suppressed, as compared with a structure in which engaging portions are not formed at the opening side end portion of the main body portion. Note that U-shaped in cross-section in the present invention also includes substantial U-shapes that are not an exact U-shape.

Further, in a frame structure of a vehicle of a tenth aspect of the present invention, in the frame structure of a vehicle of the first aspect, orientation of fibers at the reinforcing member runs along a length direction of the frame member.

In accordance with the frame structure of a vehicle of the tenth aspect, the orientation of the fibers at the reinforcing member runs along the length direction of the frame member. Accordingly, the strength (rigidity) of the frame member with respect to tensile deformation is improved as compared with a structure in which the orientation of the fibers at the reinforcing member does not nm along the length direction of the frame member.

BRIEF DESCRIPTION OF THE DRAWINGS

Exemplary embodiments of the present invention will be described in detail based on the following figures, wherein:

FIG. 6 is a cross-sectional view along arrow line Y-Y of FIG. 5.

FIG. 9 is a cross-sectional view corresponding to FIG. 4 and showing a frame structure of a vehicle relating to a fourth embodiment.

DETAILED DESCRIPTION

Embodiments of the present invention are described in detail hereinafter on the basis of the drawings. Note that, for convenience of explanation, arrow UP shown appropriately in the respective drawings is the vehicle body upward direction, arrow FR is the vehicle body frontward direction, and arrow OUT is a vehicle transverse direction outer side. Further, in the following description, when vertical, longitudinal, and left/right directions are used, they mean the vertical of the vehicle body vertical direction, the longitudinal of the vehicle body longitudinal direction, and the left/right of the vehicle body left-right direction (the vehicle transverse direction), unless otherwise stated. Moreover, although the left side of a vehicle 12 that is equipped with a frame structure 10 relating to the present embodiments is illustrated in FIG. 1, there is left/right symmetry and the right side of the vehicle 12 is similar.

Figure 1:
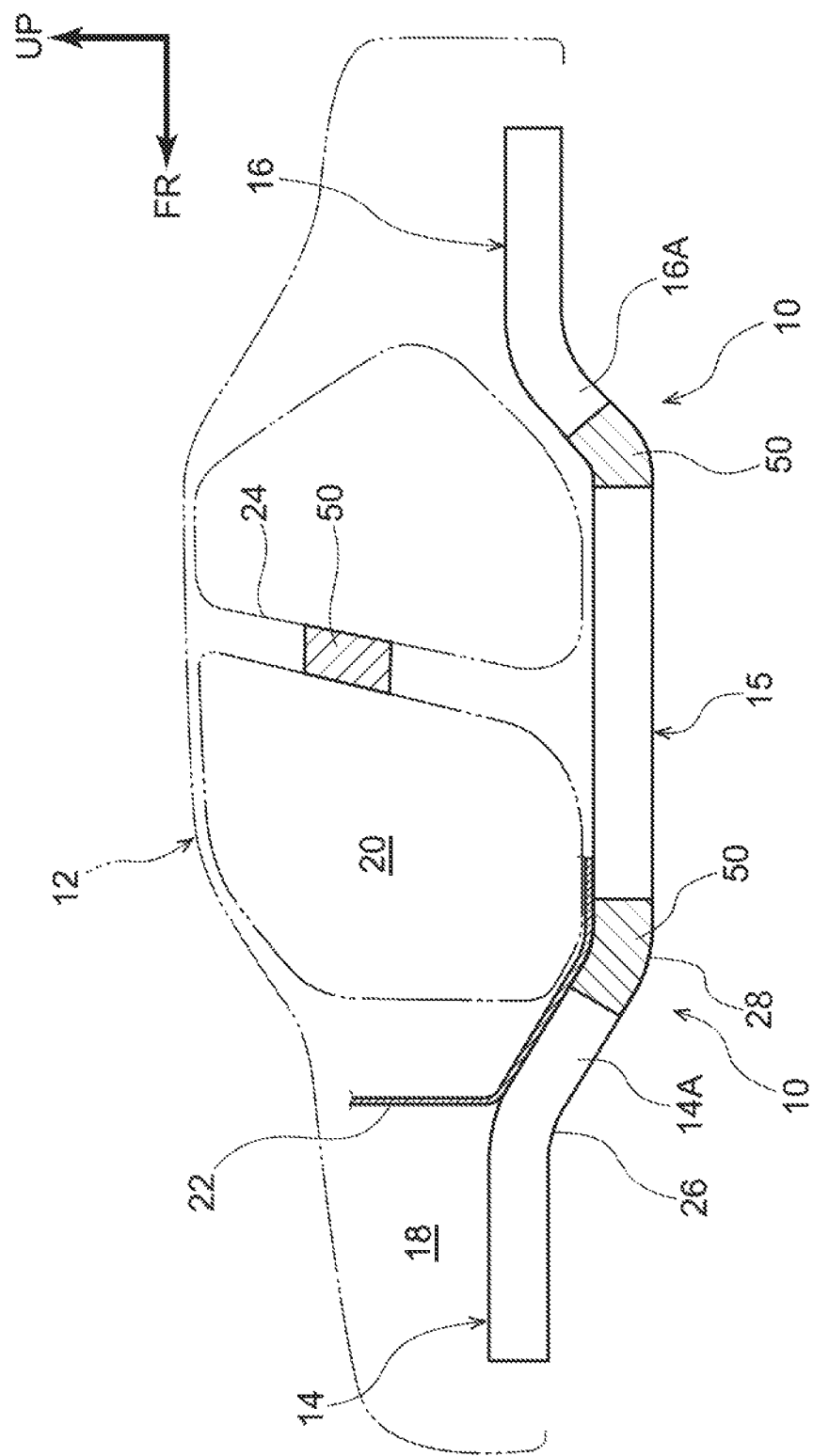
FIG. 1 is a side view showing the schematic structure of a frame structure of a vehicle relating to the present embodiments.

As shown in FIG. 1, a pair of left and right front side members 14, whose length directions are the vehicle body longitudinal direction, are disposed at both side portions at the front portion of the vehicle 12. The respective front side members 14 are vehicle frame members having closed cross-sectional shapes. An inclined portion (kick portion) 14A is formed at a midway portion in the length direction of each front side member 14. Due thereto, each of the front side members 14 extends in the vehicle body longitudinal direction with the vehicle body front side thereof, that is further forward than the inclined portion 14A, being at a position (a height position) that is a predetermined height higher than the vehicle body rear side thereof.

Further, a pair of left and right rear floor side members 16, whose length directions are the vehicle body longitudinal direction, are disposed at the both side portions at the rear portion of the vehicle 12. The respective rear floor side members 16 are vehicle frame members having closed cross-sectional shapes. An inclined portion (kick portion) 16A is formed at a midway portion in the length direction of each rear floor side member 16. Due thereto, each of the rear floor side members 16 extends in the vehicle body longitudinal direction with the vehicle body rear side thereof, that is further rearward than the inclined portion 16A, being at a position (a height position) that is a predetermined height higher than the vehicle body front side thereof.

Further, the front side member 14 and the rear floor side member 16 are structured continuously and integrally via a floor member 15 that extends in the vehicle body longitudinal direction. The respective floor members 15 also are vehicle frame members having closed cross-sectional shapes. Further, a dash panel 22, that is substantially flat-plate-shaped and that divides an engine compartment room 18 and a vehicle cabin 20, is provided at the vehicle 12.

Note that the frame structure 10 at the rear floor side member 16 side is similar to the frame structure 10 at the front side member 14 side. Therefore, hereinafter, description is given with the frame structure 10 at the front side member 14 side being used as an example.

<First Embodiment>

Figure 2:
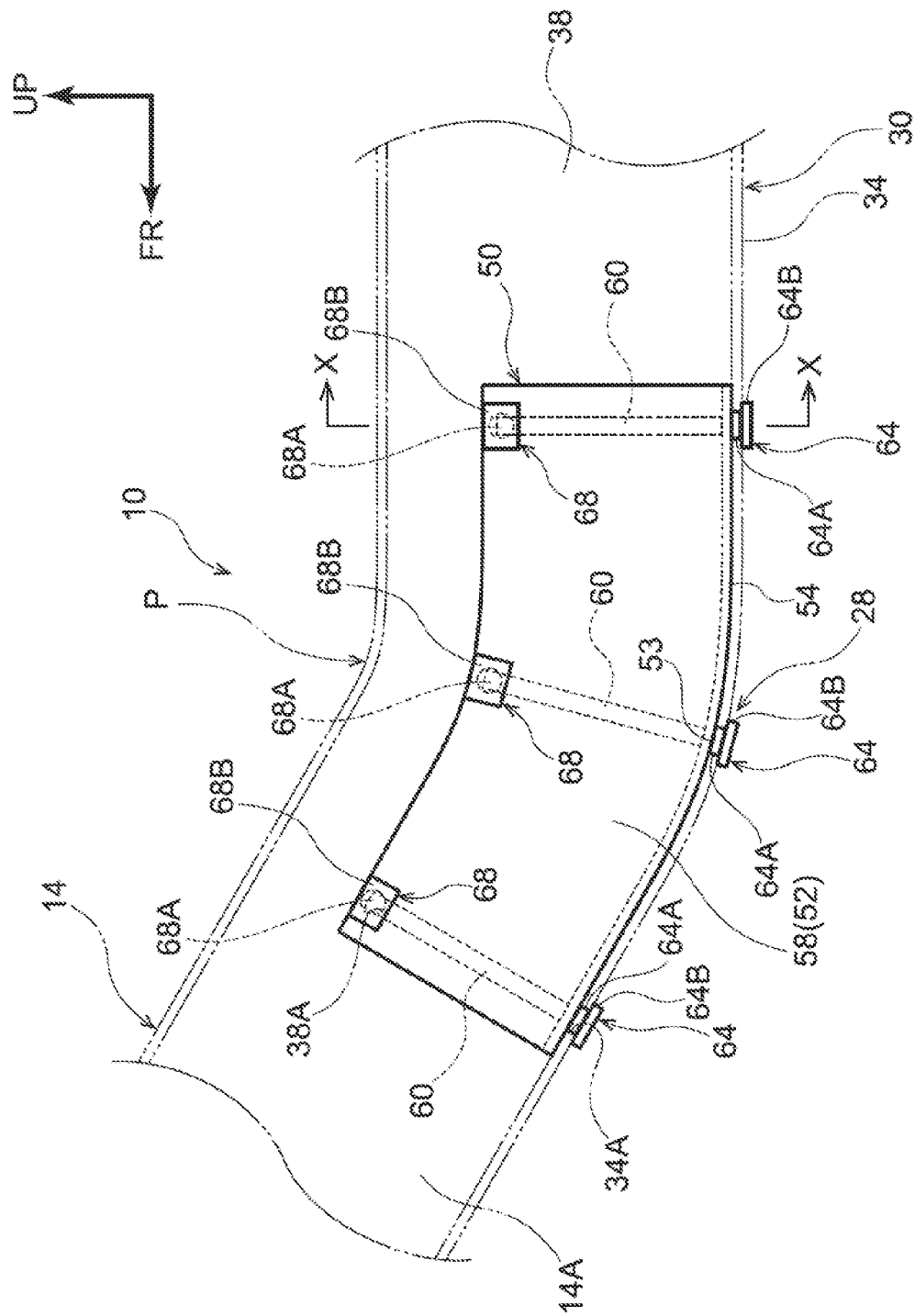
FIG. 2 is a side view showing a frame structure of a vehicle relating to a first embodiment.
Figure 3:
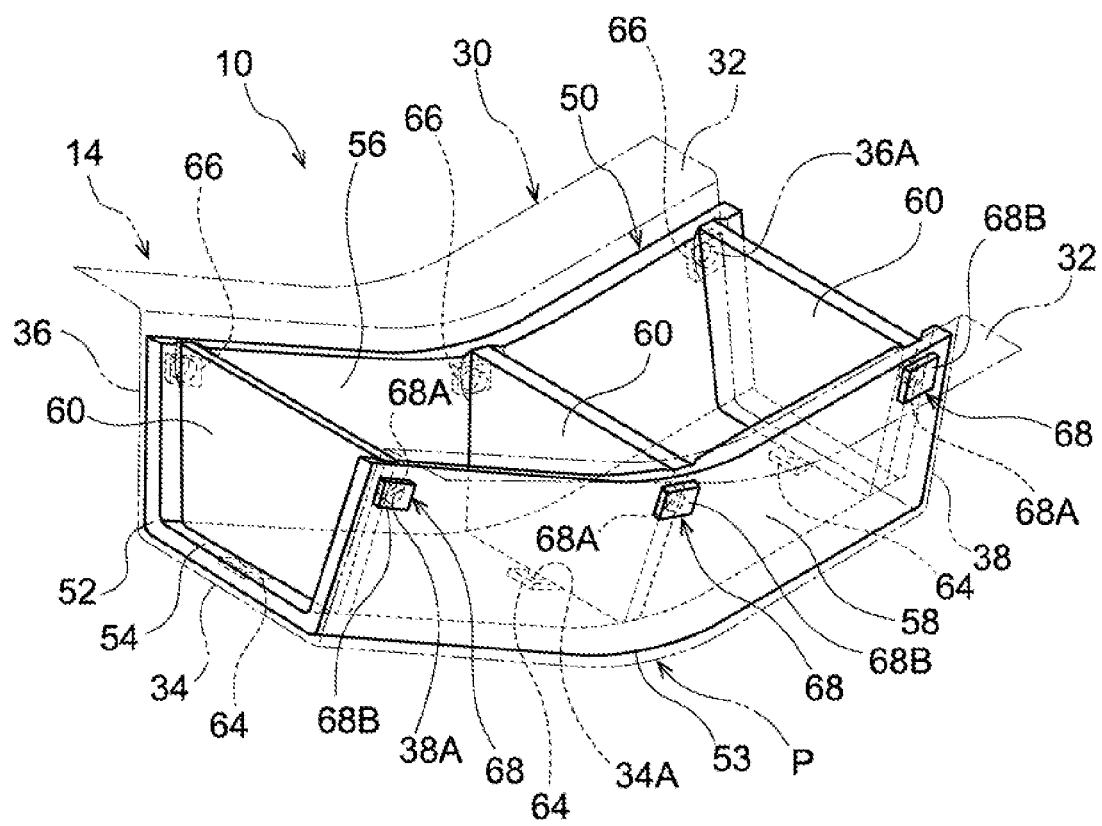
FIG. 3 is a perspective view showing the frame structure of a vehicle relating to the first embodiment.
Figure 4:
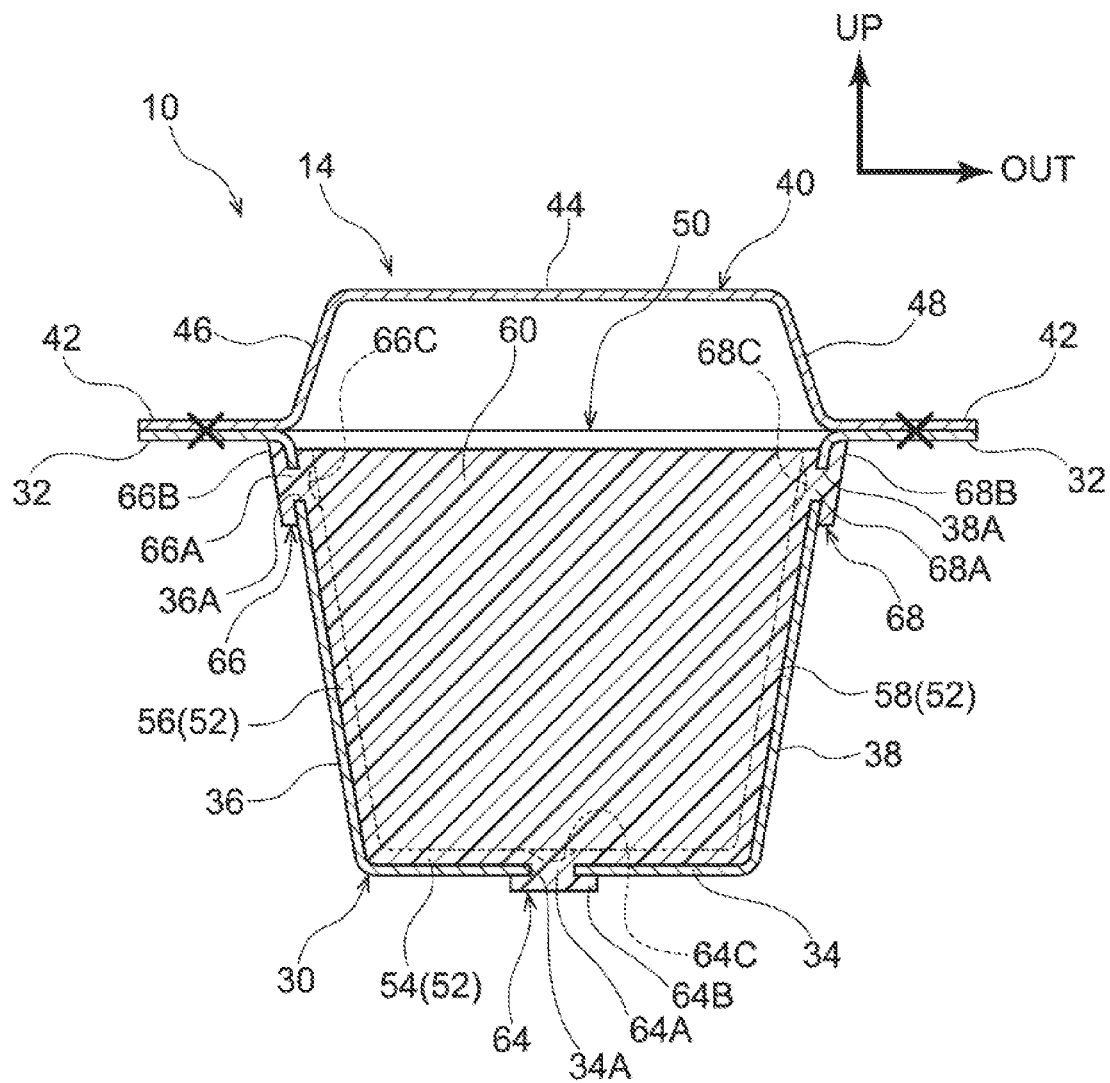
FIG. 4 is a cross-sectional view along arrow line X-X of FIG. 2.

A first embodiment is described first. As shown in FIG. 2 through FIG. 4, the front side member 14 has a lower member 30 and an upper member 40. The lower member 30 is molded from a steel plate or the like in the shape of a hat, in cross-section, whose depth is deep. The upper member 40 is molded from a steel plate or the like in the shape of a hat, in cross-section, whose depth is shallower than that of the lower member 30.

Further, as shown in FIG. 4, the front side member 14 is structured in a closed cross-sectional shape due to flanges 32, that are provided continuously toward the vehicle transverse direction inner side and outer side at the upper end portions of an inner wall 36 and outer wall 38 of the lower member 30 respectively, and flanges 42, that are provided continuously toward the vehicle transverse direction inner side and outer side at the lower end portions of an inner wall 46 and an outer wall 48 of the upper member 40 respectively, being joined by spot welding or the like.

Further, as shown in FIG. 1, the front end portion and the rear end portion (the boundary portion with the floor member 15) at the inclined portion 14A of the front side member 14 are made to be a front side bent portion 26 and a rear side bent portion 28, respectively. The front side bent portion 26 is a bent portion that is bent or curved in advance so as to be convex toward the vehicle upper side. The rear side bent portion 28 is a bent portion that is bent or curved in advance so as to be convex toward the vehicle lower side.

Accordingly, at the time of a front collision or the like of the vehicle 12, when load that is directed toward the vehicle rear side is inputted to the front end portion of the front side member 14, the front side bent portion 26 bendingly deforms toward the vehicle body upper side (a bottom wall 34 of the lower member 30 that is shown in FIG. 4 and ridgeline portions that are the vehicle transverse direction both end portions of the bottom wall 34 deform so as to buckle toward the vehicle upper side), and the rear side bent portion 28 bendingly deforms toward the vehicle body lower side (a top wall 44 of the upper member 40 that is shown in FIG. 4 and ridgeline portions that are the vehicle transverse direction both end portions of the top wall 44 deform so as to buckle toward the vehicle body lower side).

Namely, at the front side bent portion 26, the bottom wall 34 of the lower member 30 is the wall portion at the compressive deformation side (the stress concentration side), and the top wall 44 of the upper member 40 is the wall portion at the tensile deformation side. Further, at the rear side bent portion 28, the top wall 44 of the upper member 40 is the wall portion at the compressive deformation side (the stress concentration side), and the bottom wall 34 of the lower member 30 is the wall portion at the tensile deformation side.

Further, reinforcing members 50, that are respectively molded of a fiber reinforced resin material (FRP) such as a glass fiber reinforced resin material (GFRP) or a carbon fiber reinforced resin material (CFRP) for example, are disposed by insert molding within the closed cross-sectional shapes of the front side bent portion 26 and the rear side bent portion 28 of the front side member 14. Note that, because the reinforcing members 50 that are provided at the front side bent portion 26 and the rear side bent portion 28 are equivalent, hereinafter, description is given of the reinforcing member 50 that is provided at the rear side bent portion 28.

As shown in FIG. 2 and FIG. 3, the reinforcing member 50 that is provided within the closed cross-sectional shape of the rear side bent portion 28 is molded so as to conform to the bent shape thereof. In further detail, plural groups (three groups in the illustrated structure) of opening portions 36A, 38A, that are circular and face in the vehicle transverse direction, are formed at a predetermined interval in the direction in which the lower member 30 extends, in the upper portion of the rear side bent portion 28 which upper portion is adjacent to the respective flange portions 32 of the inner wall 36 and the outer wall 38 of the lower member 30. Further, opening portions 34A that respectively are circular are formed also in the vehicle transverse direction central portion of the bottom wall 34 at the same positions as the respective opening portions 36A, 38A in the vehicle transverse direction.

As shown in FIG. 2 through FIG. 4, the reinforcing member 50 has a main body portion 52 that is substantially U-shaped in cross-section and that is disposed along the bottom wall 34, the inner wall 36, the outer wall 38 of the lower member 30. Respective outer surfaces of a bottom wall 54, an inner wall 56, an outer wall 58 of the main body portion 52 are fit tightly to the respective inner surfaces of the bottom wall 34, the inner wall 36, the outer wall 38 of the lower member 30, respectively. Further, engaging portions 64, 66, 68, that are irremovably engaged with the respective opening portions 34A, 36A, 38A, are formed integrally at the time of insert molding (in the molding process) respectively with the outer surface upper end portions (the opening side end portions) of the bottom wall 54, the inner wall 56, the outer wall 58 of the main body portion 52.

Figure 5:
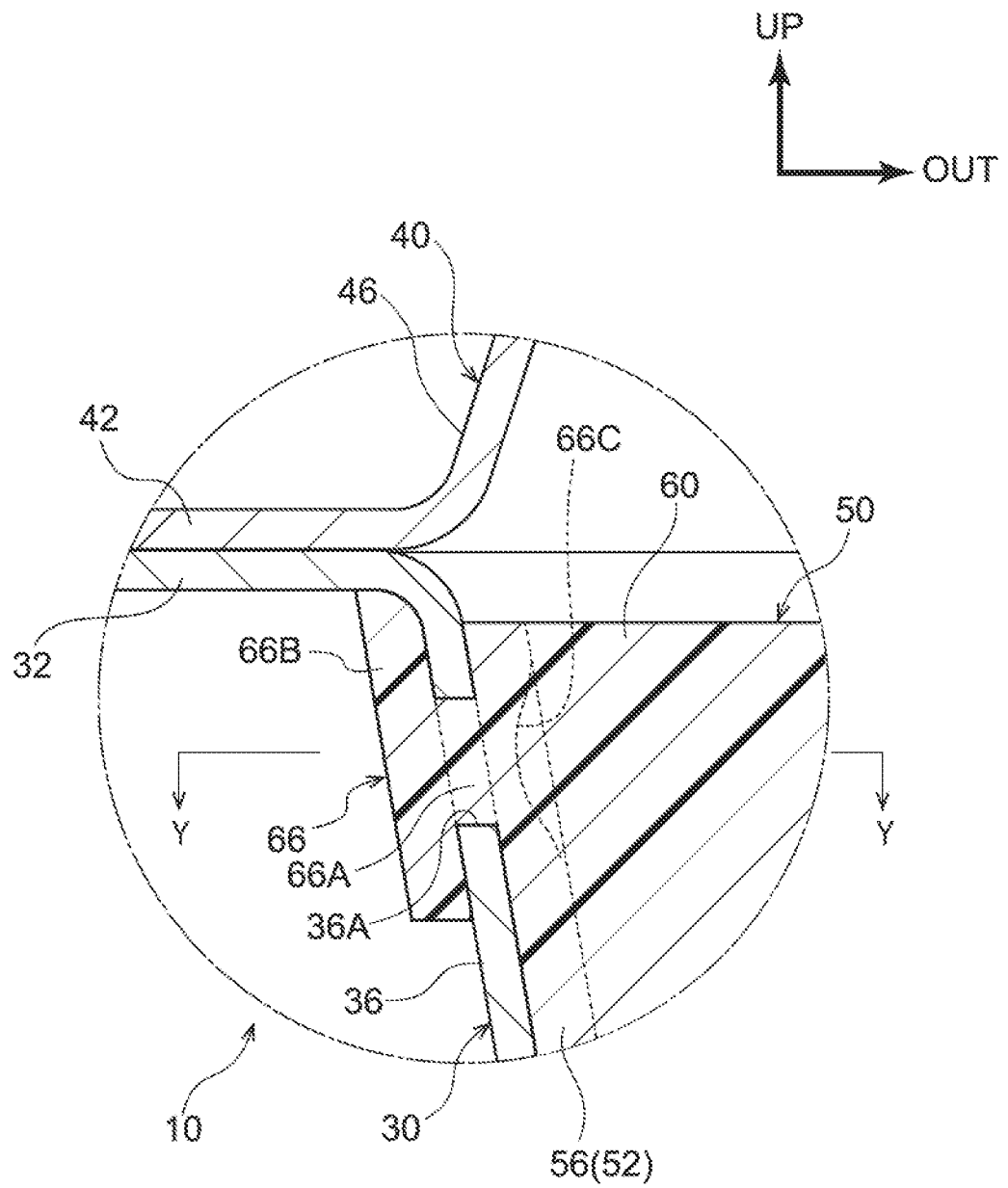
FIG. 5 is a cross-sectional view showing a portion of FIG. 4 in an enlarged manner.

With regard to the structures of the respective engaging portions 64, 66, 68, to describe by using the engaging portion 66 as an example, as shown in FIG. 5, the engaging portion 66 has an inserted-through portion 66A that is cylindrical and that is inserted-through (engaged with) the opening portion 36A, and a lock portion 66B that is shaped as a rectangular flat plate and has a surface area that is greater than the cross-sectional area of the inserted-through portion 66A (that can cover the opening portion 36A) and whose inner surface is fit tightly to the outer surface of the inner wall 36. Due thereto, there is a structure in which the respective engaging portions 64, 66, 68 cannot be removed from (are strongly joined to) the respective opening portions 34A, 36A, 38A.

Note that the shapes of the respective opening portions 34A, 36A, 38A are not limited to the illustrated circular shapes. Accordingly, the shapes of the respective inserted-through portions 64A, 66A, 68A also are not limited to the illustrated cylindrical shapes. Moreover, the shapes of the lock portions 64B, 66B, 68B also are not limited to the illustrated rectangular flat plate shapes, and the lock portions 64B, 66B, 68B may be formed in, for example, circular flat plate shapes or the like. Further, it is desirable that the respective engaging portions 64, 66, 68 are formed at least at the length direction front end portion and rear end portion of the main body portion 52.

Further, as shown in FIG. 2 through FIG. 5, plural partitioning wall portions 60 are provided integrally with the inner surface side of the main body portion 52 at predetermined intervals in the length direction of the main body portion 52. The respective partitioning wall portions 60 are formed in rectangular plate shapes that are the same heights as the inner wall 56 and the outer wall 58 (shapes that are quadrangular in cross-section and that are surrounded by the bottom wall 34, the inner wall 36, the outer wall 38), and are formed at the same positions as the respective engaging portions 64, 66, 68 (positions passing through the centers of the opening portions 34A, 36A, 38A).

Namely, the respective engaging portions 66, 68 are formed integrally with the outer surface upper end portions (opening side end portions) of the inner wall 56 and the outer wall 58 at the both sides of each partitioning wall portion 60, and the engaging portions 64 are formed integrally with the outer surface central portion of the bottom wall 54 beneath the partitioning wall portions 60. Due thereto, there is a structure in which cross-sectional deformation of the regions at which the respective engaging portions 64, 66, 68 of the main body portion 52 are formed (separation of the main body portion 52 from the lower member 30) is further suppressed or prevented, and the strength (rigidity) of the respective engaging portions 64, 66, 68 is improved.

Further, there is a structure in which a deterioration in strength (rigidity) of the bottom wall 34, the inner wall 36, the outer wall 38, in which the respective opening portions 34A, 36A, 38A of the lower member 30 are formed respectively, is suppressed by the respective partitioning wall portions 60 that are formed at the same positions as the respective engaging portions 64, 66, 68. Note that the positions at which the respective partitioning wall portions 60 are formed are desirably made to be the same positions as the respective engaging portions 64, 66, 68, but may be slightly offset in the length direction of the reinforcing member 50 from these same positions.

Further, as shown in FIG. 6, as seen in plan view, recess portions 66C, that are concave in substantially conical shapes (substantial V-shapes as seen in a plan sectional view), are formed at the inner surface of the inner wall 56 (the surface at the sides opposite to sides at which the engaging portions 66 are formed) at the regions where the engaging portions 66 are formed integrally. By using a structure in which these recess portions 66C are formed, the fibers within the fiber material at the engaging portions 66 become entwined with one another as will be described later.

Note that, as shown in FIG. 4, recess portions 68C, 64C, that are concave in substantially conical shapes (substantial V-shapes as seen in plan sectional view), are formed also respectively in the inner surface of the outer wall 58 (the surface at the sides opposite to sides at which the engaging portions 68 are formed) at the regions where the engaging portions 68 are formed integrally, and in the inner surface of the bottom wall 54 (the surface at the sides opposite to the sides at which the engaging portions 64 are formed) at the regions where the engaging portions 64 are formed integrally. As described later, the fibers within the fiber material become entwined with one another also at the respective engaging portions 68, 64.

In a case in which the reinforcing member 50 is provided at the rear side bent portion 28 that is a bent portion of the front side member 14, as shown in FIG. 2 and FIG. 3, the partitioning wall 60 is desirably formed also at a bent portion 53 of the main body portion 52 that corresponds to a maximally bent portion P (that also includes a position that offset slightly from the exact maximally bent portion P) at the lower member 30.

Namely, in a case in which the reinforcing member 50 is provided at a rectilinear portion, it suffices for the partitioning wall portions 60 to be formed at least at the length direction front end portion and rear end portion of the main body portion 52. However, in a case in which the reinforcing member 50 is provided at a bent portion, it is desirable that the partitioning wall portions 60 be formed at least at the length direction front end portion and rear end portion and the bent portion 53 of the main body portion 52. Due thereto, the strength (rigidity) of the main body portion 52 is improved efficiently.

Note that, because the strength (rigidity) of the main body portion 52 improves proportionately to the number of the partitioning wall portions 60, the partitioning wall portions 60 may be further formed at a predetermined interval in the length direction. Further, the partitioning wall portion 60 is not limited to a structure that is formed to the same height as the inner wall 56 and the outer wall 58, and may be formed to be slightly lower than the inner wall 56 and the outer wall 58.

Moreover, the partitioning wall portion 60 may be a structure that has a slight gap between itself and the bottom wall 54. Namely, the partitioning wall portion 60 may be structured so as to be connected to the inner wall 56 and the outer wall 58. Further, the plate thickness of the partitioning wall portion 60 may be made to be the same as the plate thickness of the bottom wall 54, the inner wall 56, the outer wall 58, or may be made formed to be slightly thinner or thicker than that.

Further, by molding the reinforcing member 50 by injecting a fiber reinforced resin material into a mold (not illustrated) in which the lower member 30 is placed in advance, the reinforcing member 50 is made integral with the lower member 30, and a gate mark (not shown) that is the injection opening of the fiber reinforced resin material is formed at the vehicle transverse direction central portion at a length direction one end portion side of the main body portion 52. Namely, due to the reinforcing member 50 being molded by a fiber reinforced resin material being made to flow-in from the gate of the mold that corresponds to this region, the orientation of the fibers at the bottom wall 54, the inner wall 56, the outer wall 58 run along the respective length directions thereof.

Further, due thereto, the reinforcing member 50 is a structure in which the tensile strength at the time of bending deformation in the length direction thereof (the length direction of the front side member 14) is improved. Note that, due to the fiber reinforced resin material being made to flow-in from the gate of the aforementioned mold, the partitioning wall portions 60 also are molded integrally, and therefore, the orientation of the fibers at the partitioning wall portions 60 run substantially along the height directions thereof.

Further, as shown in FIG. 6, the orientation of the fibers at the engaging portions 66 runs along the length direction of the reinforcing member 50 (the main body portion 52), and is an orientation in which the fibers become entwined with one another at the inner surface side and the outer surface side of the inner wall 36. Similarly, the orientation of the fibers at the engaging portions 68 runs along the length direction of the reinforcing member 50 (the main body portion 52), and is an orientation in which the fibers become entwined with one another at the inner surface side and the outer surface side of the outer wall 38.

In more detail, the recess portions 66C, 68C are provided at the inner surface of the inner wall 56 and the inner surface of the outer wall 58 respectively, at the regions at which the respective engaging portions 66, 68 are formed integrally. At the time of molding, it is easy for the fibers within the resin material to flow from the inner surface side toward the outer surface side (into the opening portions 36A, 38A). Namely at the time of molding, the fibers within the resin material that molds the inserted-through portions 66A 68A become entwined with the fibers that are within the resin material that molds the lock portions 66B, 68B, and, due thereto, the strength (rigidity) of the engaging portions 66, 68 is improved.

Note that the recess portions 64C are formed also at the inner surface of the bottom wall 54 at the regions where the engaging portions 64 are formed integrally. Accordingly, at the time of molding, the fibers within the resin material that molds the inserted-through portions 64A also become entwined with the fibers within the resin material that molds the lock portions 64B, and the strength (rigidity) of the engaging portions 64 is improved.

Further, owing to the respective engaging portions 64, 66, 68 that have such structures, the strength (rigidity) of the portions of the bottom wall 34, the inner wall 36, the outer wall 38 that are around the respective opening portions 34A, 36A, 38A is reinforced, and the reinforcing member 50 is joined securely to the lower member 30. Due thereto, even if load is inputted to the lower member 30 (even if the lower member 30 deforms), separation of the reinforcing member 50 from the lower member 30 is suppressed or prevented.

Operation of the frame structure 10 of the vehicle 12 relating to the first embodiment that is structured as described above is described next.

In a case in which the vehicle 12 is involved in a front collision (a full overlap collision or an offset collision) with an unillustrated barrier, load due to this impact is inputted to the front end portion of the front side member 14 via a front bumper reinforcement and a crash box that are not illustrated. Here, the rear side bent portion 28 is a bent portion that is bent or curved in advance, and the maximally bent portion P thereof is the origin of bending deformation (the deformation origin).

However, as described above, the reinforcing member 50 is provided by insert molding within the closed cross-sectional shape at the rear side bent portion 28 (the maximally bent portion P) of the front side member 14. Namely, the reinforcing member 50 is provided integrally with the lower member 30 due to the engaging portions 64, 66, 68 being irremovably engaged in the molding process with the opening portions 34A, 36A, 38A that are formed at the bottom wall 34, the inner wall 36, the outer wall 38 of the lower member 30, respectively.

Accordingly, even if load is inputted to the front end portion of the front side member 14 and a bending moment, that is such that the rear side bent portion 28 bends with the maximally bent portion P being the deformation origin, is inputted to the rear side bent portion 28, the reinforcing member 50 separating from the inner surface of the lower member 30 can be suppressed or prevented efficiently, and, at the reinforcing member 50 (the main body portion 52), reaction force (resistance) to this bending moment (tensile deformation) can be generated efficiently.

Moreover, the orientation of the fibers of the reinforcing member 50 (the main body portion 52) runs along the length direction of the lower member 30 (the direction of input of load). Therefore, the reaction force (resistance) of the reinforcing member 50 (the main body portion 52) with respect to the inputted bending moment (tensile deformation) can be improved as compared with a structure in which the orientation of the fibers of the reinforcing member 50 (the main body portion 52) does not run along the length direction of the lower member 30 (the direction of input of load).

Accordingly, the strength (rigidity) of the reinforcing member 50 (the main body portion 52) with respect to a bending moment (tensile deformation) that is inputted to the rear side bent portion 28 can be improved, and this bending moment (tensile deformation) can be suppressed efficiently.

Further, the partitioning wall portion 60 is provided so as to stand integrally at the bent portion 53 of the reinforcing member 50 (the main body portion 52) that corresponds to the maximally bent portion P of the rear side bent portion 28. Accordingly, the buckling withstand force of the reinforcing member 50 (the main body portion 52) can be improved, and cross-sectional deformation (buckling deformation) of the reinforcing member 50 (the main body portion 52) can be suppressed.

Namely, cross-sectional deformation (buckling deformation) in which the inner wall 36 becomes convex toward the vehicle transverse direction inner side, and cross-sectional deformation (buckling deformation) in which the outer wall 38 becomes convex toward the vehicle transverse direction outer side, can be suppressed. Accordingly, the strength (rigidity) of the region of bending deformation (plastic deformation), at which the origin of the deformation is the rear side bent portion 28 (the maximally bent portion P) of the front side member 14 (the inclined portion 14A), can be improved, and this bending deformation can be effectively suppressed (mitigated).

Further, due thereto, at the time of a front collision of the vehicle 12, the portion of the front side member 14, which portion is further toward the vehicle body front side than the rear side bent portion 28, can be compressively deformed (crushed) efficiently in the axial direction thereof (the vehicle body longitudinal direction). Accordingly, the inputted collision load can be absorbed efficiently at the rectilinear portion of the front side member 14.

In other words, the rear side bent portion 28 (a region at which it is predicted that bending deformation will arise), that starts to be bendingly deformed by load that is inputted to the front end portion of the front side member 14, can be locally reinforced efficiently by the reinforcing member 50. Therefore, a deterioration in the collision safety performance, that accompanies the problem of compressive deformation in the axial direction of the front side member 14 and an increase in the amount of bending deformation of the rear side bent portion 28, can be suppressed or prevented.

In this way, in accordance with the frame structure 10 of the vehicle 12 relating to the first embodiment, at the time of a front collision of the vehicle 12, deformation of the vehicle cabin 20 can be suppressed or prevented, and the space, in the longitudinal direction, of the vehicle cabin 20 can be ensured to be wide. Moreover, because the reinforcing member 50 is made of a fiber reinforced resin and the weight thereof is made to be light, fuel efficiency can be improved and exhaust gas can be reduced, as compared with a structure that is reinforced by a metal plate or the like.

Further, owing to this reinforcing member 50, a decrease in rigidity of the vehicle body can be suppressed, and the strength (rigidity) of the elastic deformation region of the rear side bent portion 28 also can be improved. Therefore, at the time when the vehicle 12 travels, vibration and noise that arise at the vehicle 12, and moreover, a deterioration in the handling stability performance of the vehicle 12, can be suppressed or prevented. Note that the same holds also for operation in a case in which the reinforcing member 50 is provided at the front side bent portion at the rear floor side member 16.

Further, the reinforcing member 50 is made of a fiber reinforced resin and the weight thereof is made to be light. Therefore, the reinforcing member 50 can be provided at, among the frame members that have closed cross-sectional shapes and that structure the frame of the vehicle 12, all of the regions that are not bent portions that are bent or curved in advance and at which it is predicted that bending deformation will arise at the time of a collision of the vehicle 12. For example, as shown in FIG. 1, the reinforcing member 50 can be provided within the closed cross-sectional shape of a center pillar 24 that extends substantially rectilinearly in the vehicle body vertical direction, or the like.

In a case in which the reinforcing member 50 is provided within the closed cross-sectional shape of the center pillar 24 that is an example of a region that is not bent or curved in advance, it suffices to provide the reinforcing member 50 integrally by insert molding at the inner surface of an inner panel (not illustrated) at a predetermined region of the center pillar 24 at which it is predicted that bending deformation will arise at the time of a side collision of the vehicle 12.

In accordance with such a structure, when the vehicle 12 is involved in a side collision and the predetermined region of the center pillar 24 bendingly deforms (deforms so as to buckle) toward the vehicle transverse direction inner side, the inner panel side is the tensile deformation side, and therefore, the reinforcing member 50 is pulled along the length direction thereof, i.e., the direction of orientation of the fibers. However, because reaction force (resistance) to this tensile deformation arises at the reinforcing member 50, bending deformation of the center pillar 24 toward the vehicle transverse direction inner side can be suppressed.

Moreover, because cross-sectional deformation of the reinforcing member 50 is suppressed by the partitioning wall portions 60, cross-sectional deformation of the center pillar 24 is suppressed. Namely, bending deformation of the center pillar 24 toward the vehicle transverse direction inner side is suppressed more effectively by the reinforcing member 50 that is provided with the partitioning wall portions 60. Accordingly, deformation of the vehicle cabin 20 at the time of a side collision of the vehicle 12 can be suppressed more effectively.

<Second Embodiment>

A second embodiment is described next. Note that, in the second embodiment, regions that are equivalent to those of the above-described first embodiment are denoted by the same reference numerals, and detailed description thereof (including common operation) is omitted as appropriate.

At the lower member 30 in the second embodiment, the shapes of the portions of the bottom wall 34, the inner wall 36, the outer wall 38 at the peripheries of the opening portions 34A, 36A, 38A where the engaging portions 64, 66, 68 are provided, differ from those of the bottom wall 34, the inner wall 36, the outer wall 38 of the lower member 30 in the first embodiment. Note that, because the shapes of the bottom wall 34, the inner wall 36, the outer wall 38 around the respective opening portions 34A, 36A, 38A are the same, here, description is given by using the bottom wall 34 as an example.

Figure 7:
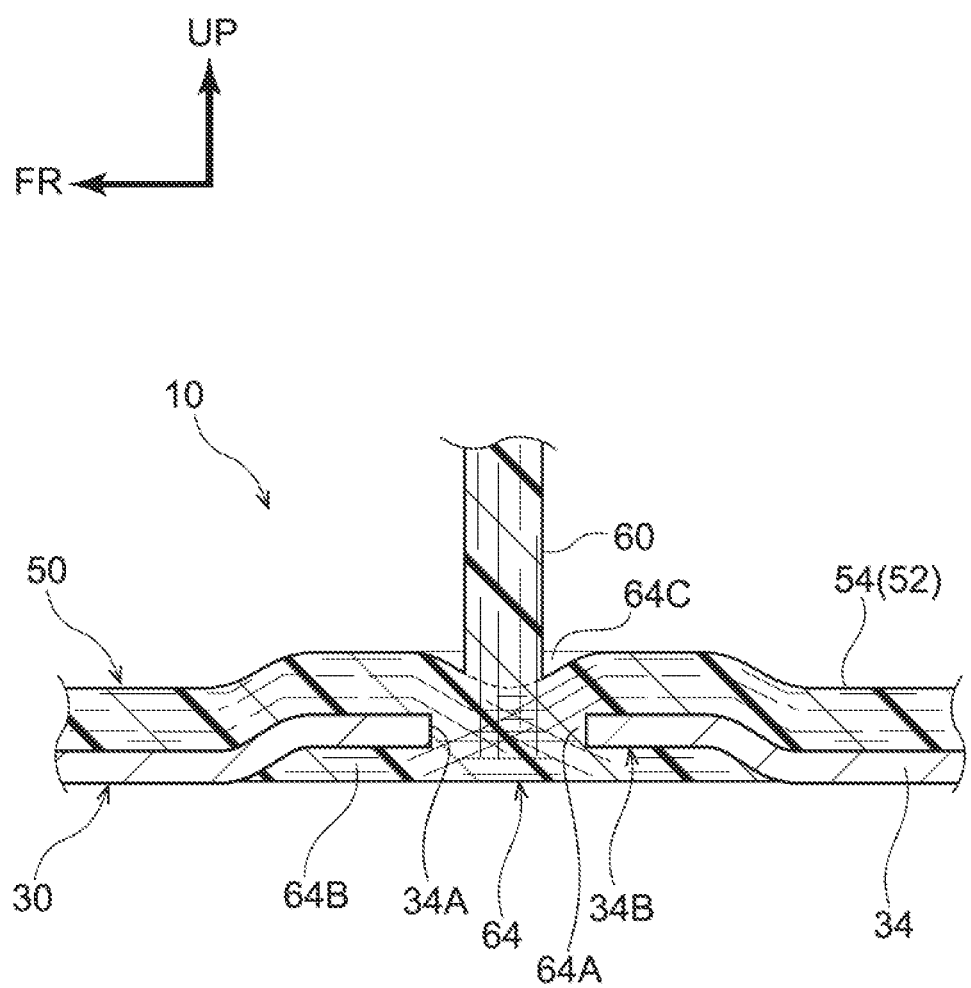
FIG. 7 is a cross-sectional view showing, in an enlarged manner, a bottom wall side of a frame structure of a vehicle relating to a second embodiment.

As shown in FIG. 7, the periphery of the opening portion 34A of the bottom wall 34 of the lower member 30 is made to be a concave portion 34B that is concave in a substantially truncated conical shape toward the interior of the closed cross-sectional shape. The lock portion 64B at the engaging portion 64 is disposed within this concave portion 34B. There is a structure in which the depth of the concave portion 34B is greater than or equal to the thickness of the lock portion 64B, and the lock portion 64B protruding-out further toward the lower side (the outer side) than the outer surface of the bottom wall 34 is suppressed or prevented.

Accordingly, even if there is no space at the outer surface sides (the vehicle transverse direction inner side and outer side and the vehicle body vertical direction lower side) of the lower member 30 (the front side member 14), the reinforcing member 50 can be provided integrally by insert molding at the inner surface sides of the bottom wall 34, the inner wall 36, the outer wall 38 of the lower member 30.

<Third Embodiment>

A third embodiment is described next. Note that, in the third embodiment, regions that are equivalent to those of the above-described first embodiment and second embodiment are denoted by the same reference numerals, and detailed description thereof (including common operation) is omitted as appropriate.

Figure 8:
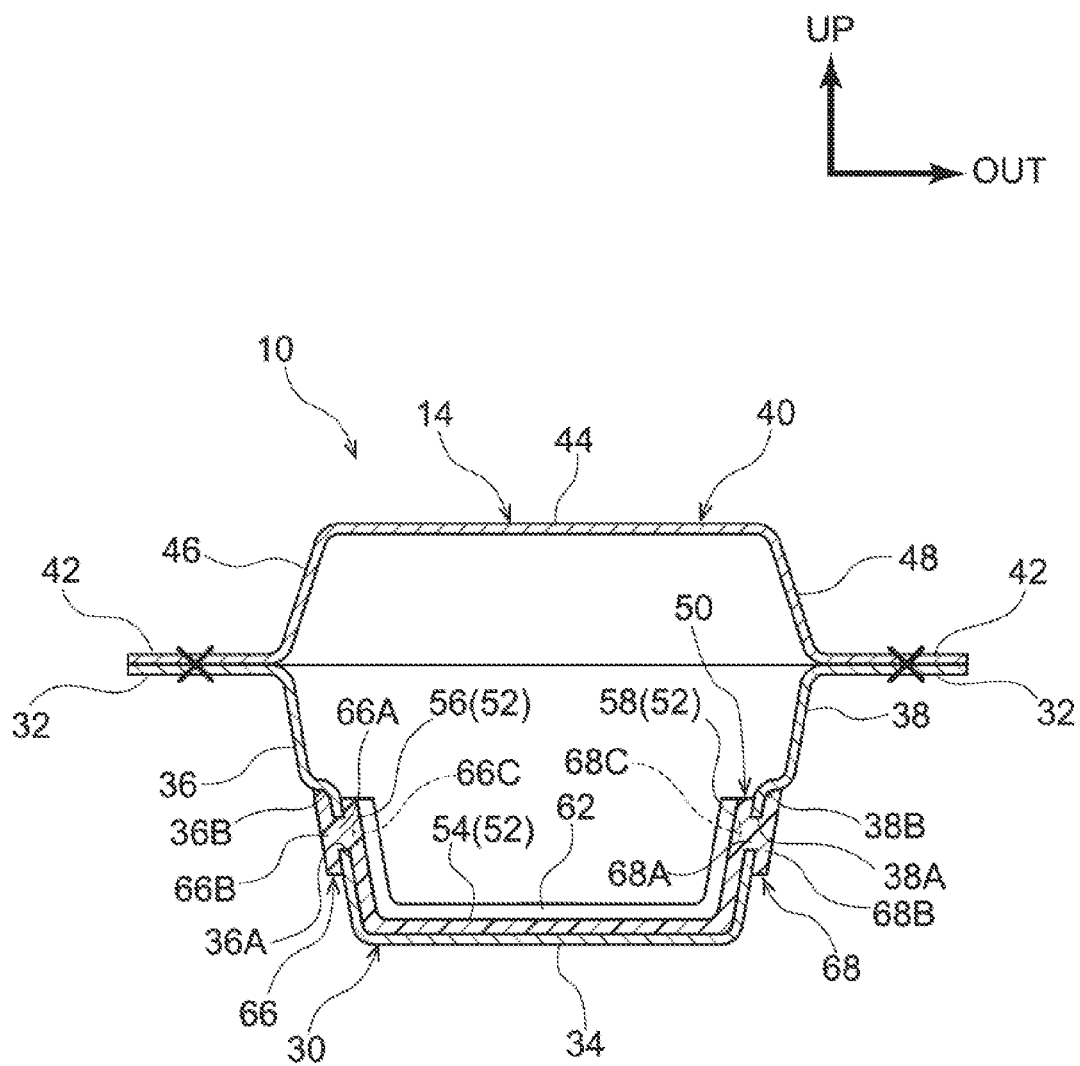
FIG. 8 is a cross-sectional view corresponding to FIG. 4 and showing a frame structure of a vehicle relating to a third embodiment.

As shown in FIG. 8, the depth of the lower member 30 of the third embodiment is formed to be more shallow than that of the lower member 30 of the first embodiment. Step portions 36B, 38B, whose lower portion sides are concave toward the interior of the cross-sectional shape more than the upper portion sides thereof respectively, are formed at the central portions in the vehicle body vertical direction of the inner wall 36 and the outer wall 38.

Further, the opening portion 36A is formed at the lower portion side of the inner wall 36, and the opening portion 38A is formed at the lower portion side of the outer wall 38. The depths (the heights in the vehicle transverse direction) of the step portions 36B, 38B are made to be greater than or equal to the thicknesses of the lock portions 66B, 68B. Accordingly, the lock portion 66B protruding-out further toward the vehicle transverse direction inner side (the outer side) than the outer surface of the upper portion of the inner wall 36 is suppressed or prevented. The lock portion 68B protruding-out further toward the vehicle transverse direction outer side (the outer side) than the outer surface of the upper portion of the outer wall 38 is suppressed or prevented.

Due thereto, even if there is no space at the outer surface sides (the vehicle transverse direction inner side and outer side) of the lower member 30 (the front side member 14), the reinforcing member 50 can be provided integrally by insert molding at the inner surface sides of the bottom wall 34, the inner wall 36, the outer wall 38 of the lower member 30.

Further, at the reinforcing member 50 of this third embodiment, plural reinforcing ribs 62 are provided so as to project integrally at the inner surface of the main body portion 52, instead of the plural partitioning wall portions 60. In further detail, each of the reinforcing ribs 62 is formed in a substantial U-shape in cross-section, and is formed integrally to a predetermined height along the inner surfaces of the bottom wall 54, the inner wall 56, and the outer wall 58.

Owing to the reinforcing ribs 62, there is a structure in which the strength (rigidity) of the reinforcing member 50 (including the respective engaging portions 64, 66, 68) is improved, and a deterioration in strength (rigidity) of the bottom wall 34, the inner wall 36, the outer wall 38, in which the respective opening portions 34A, 36A, 38A of the lower member 30 are respectively formed, is suppressed. Note that the thickness of the reinforcing ribs 62 may be the same as the thickness of the partitioning wall portions 60, or may be different therefrom.

Further, in the third embodiment, because the depth of the lower member 30 is shallow, the strength (rigidity) of the lower member 30 is improved. Accordingly, cross-sectional deformation of the lower member 30 (the reinforcing member 50) can be suppressed even by using the reinforcing ribs 62 that are shorter than the partitioning wall portions 60. Note that the reinforcing ribs 62 in the third embodiment have the advantage of being able to be applied to cases in which provision of the partitioning wall portions 60 at the inner surface side of the main body portion 52 (within the closed cross-sectional shape) is impossible.

<Fourth Embodiment>

A fourth embodiment is described next. Note that, in the fourth embodiment, regions that are equivalent to those of the above-described first embodiment through third embodiment are denoted by the same reference numerals, and detailed description thereof (including common operation) is omitted as appropriate.

As shown in FIG. 9, in the fourth embodiment, the reinforcing member 50 is provided integrally by insert molding at the outer surface sides of the lower portions of the bottom wall 34, the inner wall 36, the outer wall 38 of the lower member 30 of the third embodiment. Namely, the respective engaging portions 66, 68 are engaged, from the outer surface sides, with the opening portions 36A that are formed at the lower portion side of the inner wall 36 and the opening portions 38A that are formed at the lower portion side of the outer wall 38 respectively, and the respective lock portions 66B, 68B are disposed at the inner surface side of the lower member 30 (within the closed cross-sectional shape).

Further, the lower end portions of the respective lock portions 66B, 68B abut the inner surface of the bottom wall 34 of the lower member 30. Namely, the surface areas of the respective lock portions 66B, 68B are made to be larger than the surface areas of the lock portions 66B, 68B in the first embodiment through third embodiment. Due thereto, the lower portion side of the inner wall 36 of the lower member 30 is nipped and fixed by the inner wall 56 of the main body portion 52 and the lock portion 66B, and the lower portion side of the outer wall 38 of the lower member 30 is nipped and fixed by the outer wall 58 of the main body portion 52 and the lock portion 68B.

Namely, the reinforcing member 50 is securely joined to the outer surface sides of the lower portions of the bottom wall 34, the inner wall 36, the outer wall 38 of the lower member 30. Accordingly, even if load is inputted to the front end portion of the front side member 14 and a bending moment, that is such that the rear side bent portion 28 bends with the maximally bent portion P being the deformation origin, is inputted to the rear side bent portion 28, the reinforcing member 50 separating from the outer surface of the lower member 30 is suppressed or prevented.

Further, the inner wall 56 and the outer wall 58 of the reinforcing member 50 are disposed at the step portions 36B, 38B that are formed at the lower portion side of the inner wall 36 and the lower portion side of the outer wall 38 respectively, and the thickness of at least the inner wall 56 and the outer wall 58 is made to be less than or equal to the depth (the height in the vehicle transverse direction) of the step portions 36B, 38B. Accordingly, the inner wall 56 projecting-out further toward the vehicle transverse direction inner side (the outer side) than the outer surface of the upper portion of the inner wall 36 is suppressed or prevented, and the outer wall 58 projecting-out further toward the vehicle transverse direction outer side (the outer side) than the outer surface of the upper portion of the outer wall 38 is suppressed or prevented.

Due thereto, even if there is no space at the outer surface sides (the vehicle transverse direction inner side and outer side) of the lower member 30 (the front side member 14), the reinforcing member 50 can be provided integrally by insert molding at the outer surface sides of the bottom wall 34, the inner wall 36, the outer wall 38 of the lower member 30. Note that, in the case of the reinforcing member 50 of the fourth embodiment, the recess portions 66C, 68C are formed respectively in the outer surface of the inner wall 56 and the outer surface of the outer wall 58 that are the surfaces at the opposite sides with respect to the inserted-through portions 66A, 68A.

The frame structure 10 of the vehicle 12 relating to the present embodiments has been described above on the basis of the drawings, but the frame structure 10 of the vehicle 12 relating to the present embodiments is not limited to the illustrated structures, and appropriate changes in design can be made thereto within a scope that does not depart from the gist of the present invention. For example, the second embodiment through the fourth embodiment may be applied to the center pillar 24. Namely, the reinforcing member 50 in the second embodiment through the fourth embodiment may be provided by insert molding at the inner panel of the center pillar 24.

Further, the reinforcing member 50 is not limited to a structure of being provided integrally with the lower member 30 of the front side member 14 or the inner panel of the center pillar 24 by insert molding. For example, there may be a structure in which a fiber reinforced resin material is layered on and affixed to the lower member 30 of the front side member 14 or the inner panel of the center pillar 24, and, thereafter, is thermally hardened and provided integrally.

Namely, it suffices for the reinforcing member 50 to be a structure that, in the process of molding thereof, is provided integrally with the front side member 14 or the center pillar 24. Further, the reinforcing member 50 may be structured so as to be provided integrally at the upper member 40 side as well, in the same way as at the lower member 30. In this case, it suffices to form opening portions (not illustrated), that face in the vehicle transverse direction, in the lower portions, that are adjacent to the respective flange portions 42, of the inner wall 46 and the outer wall 48 of the upper member 40, and to form opening portions (not illustrated) in the vehicle transverse direction central portion of the top wall 44 at the same positions as the respective opening portions in the vehicle transverse direction.

What is claimed is:

1. A frame structure of a vehicle, comprising:
a frame member that structures a frame of a vehicle; and
a reinforcing member that is made of a fiber reinforced resin,
wherein the frame member is formed in a closed cross-sectional shape by a plurality of wall portions, and the frame member includes opening portions in at least one of the wall portion among the plurality of wall portions, and
the reinforcing member is disposed along the wall portions that have the opening portions, the reinforcing member includes engaging portions having inserted-through portions that are inserted-through the opening portions and lock portions whose surface area is larger than the opening portions, and the engaging portions are integrally formed by the inserted-through portions and the lock portions.

2. The frame structure of a vehicle of claim 1, wherein the reinforcing member is disposed within the closed cross-sectional shape.

3. The frame structure of a vehicle of claim 2, wherein the wall portions that have the opening portions have concave portions at which peripheries of the opening portions are concave toward an interior of the closed cross-sectional shape, and the lock portions are disposed within the concave portions.

4. The frame structure of a vehicle of claim 2, wherein the reinforcing member extends in a length direction of the frame member, and has a plurality of partitioning wall portions that are formed at a predetermined interval in the length direction.

5. The frame structure of a vehicle of claim 4, wherein the opening portions are formed so as to face in a direction orthogonal to the length direction of the frame member, and the engaging portions are formed at both sides of the partitioning wall portions.

6. The frame structure of a vehicle of claim 2, wherein the reinforcing member extends in a length direction of the frame member, and has a plurality of reinforcing ribs that are formed at a predetermined interval in the length direction.

7. The frame structure of a vehicle of claim 6, wherein the opening portions are formed so as to face in a direction orthogonal to the length direction of the frame member, and the engaging portions are formed at both sides of the reinforcing ribs.

8. The frame structure of a vehicle of claim 1, wherein the reinforcing member has recess portions in surfaces at sides opposite to sides at which the engaging portions are formed.

9. The frame structure of a vehicle of claim 1, wherein the reinforcing member has a main body portion that is formed in a U-shape in cross-section, and the engaging portions are formed at least at an opening side end portion of the main body portion.

10. The frame structure of a vehicle of claim 1, wherein orientation of fibers at the reinforcing member runs along a length direction of the frame member.

* * * * *